March 10, 1959 E. S. BARNITZ ET AL 2,877,134
SELF-LUBRICATING BEARINGS AND METHOD OF MAKING THE SAME
Filed Oct. 11, 1952
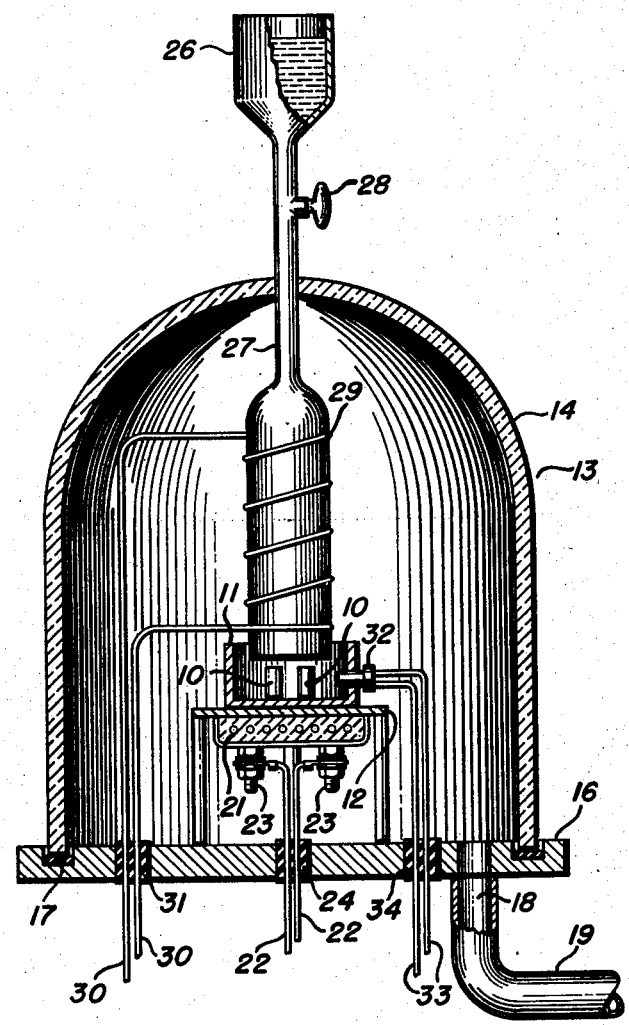
EDWARD S. BARNITZ
MERRIAM E. JOHNSON
INVENTORS
BY
ATTORNEYS 2,877,134

SELF-LUBRICATING BEARINGS AND METHOD OF MAKING THE SAME

Edward S. Barnitz and Merriam E. Johnson, Rochester, N. Y., assignors, by mesne assignments, to Consolidated Electrodynamics Corporation, Pasadena, Calif., a corporation of California Application October 11, 1952, Serial No. 314,354

2 Claims. (Cl. 117—61)

This invention relates to methods of preparing self-lubricating bearing surfaces suitable for use over prolonged periods of time without the addition of lubricant during service and to bearings prepared thereby.

Most mechanical devices, and particularly precision instruments such as watches and the like having moving parts, depend for successful operation upon proper lubrication of the bearing surfaces. It has been necessary heretofore to maintain a layer of lubricant between the bearing surfaces to prevent excessive wear, and also, in the case of precision instruments, to periodically clean the bearings of dust and dirt accumulating in the lubricant.

Furthermore, particularly in the case of precision instruments, the instrument manufacturer usually employs a high-quality lubricating oil, such as the synthetic organic ester lubricants, where as the buyer does not always have such costly lubricants available and may use a less desirable lubricating oil during service, with a consequent deleterious effect on the operation of the instrument.

It is accordingly an object of this invention to provide self-lubricating bearing surfaces suitable for use over prolonged periods of time without the addition of lubricant during service.

It is a further object of the invention to provide a highly effective method of preparing self-lubricating bearings.

It is another object of the invention to prepare bearings which can be employed in motors, watches or other mechanical devices without necessitating periodic oiling during service.

Another object of the invention is to provide dry bearings which are self-lubricating during service.

Another object of the invention is to minimize or eliminate the necessity for cleaning and relubricating precision instruments due to dirt accumulating in the bearing lubricant.

Another object of the invention is to provide a method of preparing improved metal or jewel bearings.

Another object of the invention is to provide bearings initially and permanently lubricated with a high quality lubricant whereby the deleterious effects of using lower grade lubricants during service is overcome.

Other objects will be apparent from the description and claims which follow.

These and other objects are attained by means of this invention which comprises preparing self-lubricating bearing surfaces suitable for use over prolonged periods of time without the necessity of additional lubrication during service by degassing a bearing surface at a pressure below 100 microns Hg, covering the resulting degassed bearing surface with degassed lubricating oil while the bearing surface is maintained under such reduced pressure, and then releasing the pressure to atmospheric pressure preferably while a layer of the lubricating oil is on the bearing surface.

The single figure of the drawings is a view in elevation, partly broken away and in section of a typical apparatus being employed in an impregnation process embodying the invention.

In describing the invention and in the appended claims, the term "bearing surface" is intended to include the contact surface of any of the well-known bearing types, including metal, jewel and other similar bearings, and also including the contact surface of any element frictionally engaging the bearing, it being immaterial for purposes of this invention whether either or both of such contacting surfaces is treated in accordance with the invention. Thus for example, in a pivot bearing prepared in accordance with this invention, the bearing surface which is lubricant impregnated can be the contact surface of either the pivot or the bearing itself or of both since lubrication at the interface is accomplished in either case.

Porous bearings have, of course, been pressure impregnated heretofore to occlude lubricant in the bearing pores but such lubricant bleeds out and is quickly used up since the bearing merely serves as a limited well or reservoir for lubricant.

We have discovered, however, that, when a bearing surface, whether considered porous or not, is thoroughly degassed under high vacuum to remove absorbed and adsorbed gases, moisture and other volatiles as well as volatiles merely occluded in the surface interstices, and the bearing surface is covered with degassed oil under the high vacuum, and the pressure then raised to atmospheric pressure, the lubricant not only fills any surface pores but apparently also takes the place of the absorbed and adsorbed volatiles to give a highly tenacious molecular film of lubricant over the entire surface. Such a lubricant layer is not removed by wiping, frictional contact during service or even by washing the bearing surface with a solvent for such lubricant. After impregnation of the bearing surfaces in accordance with this invention, the surface can be wiped dry so that no visible lubricant film remains and the resulting apparently dry bearing will operate entirely satisfactorily for many years of continuous use without further lubrication or cleaning.

The invention is applicable for treating any bearing surface including metal surfaces such as steel, brass, Babbit, or other metal bearing material and including powdered metal bearings as well as cast, plated and machined bearings or the like. The bearing can also be a jewel bearing such as a sapphire or ruby bearing, whether natural or synthetic, or any other suitable bearing material since the material of which the bearing surface consists does not affect the applicability of the invention.

The degassing of the bearing surface is preferably effected at a pressure below 100 microns Hg with pressures below 10 microns being preferred and pressures below 1 micron and as low as 0.1 micron or lower being desirably employed for optimum results. The degassing is desirably assisted by directing applied energy to the bearing surface to ensure removal of the absorbed and adsorbed molecular film of volatiles at such reduced pressure. Thus the bearing surface can be heated either by conduction, radiation or induction, or the applied energy can be in the form of supersonic vibrations, or an electron stream or similar energy bombardment effective to dislodge absorbed and adsorbed volatiles. The application of heat is the simplest method of facilitating the degassing in many cases, and any temperature can be employed up to the temperature at which the bearing itself would be deleteriously affected, with high temperatures being effective to ensure thorough degassing in a minimum time.

After degassing of the bearing surface has been completed, the resulting degassed material is maintained at such reduced pressure and the bearing surface is covered with a layer of suitable lubricating oil. When the degassing includes heating, the bearing material is allowed to cool down under vacuum before application of the lubricating oil to the bearing surface. The lubricating oil can be applied as a relatively thin film on the bearing surface or the entire bearing can be immersed in the lubricant as desired. The lubricating oil employed is desirably a high grade lubricant such as the synthetic organic esters or ethers, or the hydrocarbon fractions commonly used for lubricating precision instruments, although petroleum lubricants or other well-known fluid materials can be used if desired. The lubricating oil should be degassed prior to application to the bearing surface for best results, since otherwise the volatiles in the oil will be adsorbed, absorbed and occluded to a greater or lesser degree and thereby detract from the deposition of a molecular lubricant film over the bearing surface. The oil should, of course, be degassed at a pressure generally corresponding to or lower than that employed for degassing the bearing surface for best results, and such degassing can be effected at the same time as the degassing of the bearing surfaces if desired or by any well-known oil degassing procedure.

When the degassed oil contacts the degassed bearing surface, at least a monomolecular layer of the oil becomes tightly bonded to the bearing surface, the exact nature of the bond between the lubricant layer and the bearing surface being unknown at this time. For complete impregnation, a layer of degassed oil is desirably but not necessarily maintained on the bearing surface while the pressure is raised to atmospheric pressure is raised to atmospheric pressure whereby the oil is also driven into all surface interstices by the great pressure differential and optimum lubrication is obtained. After such processing the bearings or other elements having bearing surfaces can be used directly if desired, or the excess oil on the bearing surface can be wiped off or washed off with a solvent such as benzene to give a dry bearing which nevertheless operates entirely satisfactorily without further lubrication for years of constant service.

A typical impregnation process embodying the invention is illustrated in the drawings. The bearings to be impregnated, such as metal sleeve bearings 10, 10, are placed in a cup 11 which is supported on a heater rack 12 mounted inside a vacuum chamber 13. Vacuum chamber 13 which, in the embodiment shown, consists of a bell dome 14 mounted on a base 16 having a gasket seal 17, is provided with an exhaust port 18 which is connected to a suitable high vacuum pumping system (not shown) by exhaust conduit 19. Heater element 21, which is attached to heater rack 13, is connected to a conventional power circuit by leads 22, 22 which are connected to heater element 21 at binding posts 23, 23 and which leave chamber 13 through vacuum tight plug 24 mounted in base 16.

A reservoir 26 for lubricant has a drain conduit 27 which enters chamber 13 through dome 14. Conduit 27 is flared inside chamber 13 and terminates directly above cup 11 in which the bearings 10, 10 are impregnated. A suitable valve 28 in drain conduit 27 serves to regulate the flow of lubricant. A heater coil 29 is wound around the flared portion of conduit 27 inside chamber 13, and the leads 30, 30 of coil 29 extend out of chamber 13 through plug seal 31 mounted in base 16 and are connected into a suitable power circuit (not shown).

A thermocouple 32 is mounted in cup 11 with suitable leads 33, 33 out of the chamber through plug 34 in base 16.

In practicing the process embodying the invention, the sleeve bearings are placed in the cup, the chamber is closed and the evacuation of the chamber is begun. During the evacuation of the chamber, the sleeve bearings are heated to a temperature above 200° C. and the heating and evacuation are continued until a steady pressure below 1 micron Hg is reached. The heater is then turned off and the bearings are allowed to cool to a temperature at or near room temperature. The heater coil on the lubricant drain conduit is then energized and the drain valve opened to allow lubricant to trickle down into the vacuum chamber. The pumping system is maintained in operation throughout the process and the oil is thoroughly degassed during passage down the drain conduit from which it drips into the cup containing the sleeve bearings. When the bearings are immersed in oil, the vacuum is broken and the bearings removed and wiped dry. The seemingly dry bearings are then ready for installation in a motor or similar apparatus.

The invention is illustrated by the following examples of preferred embodiments thereof, it being understood that the examples are illustrative only and are not intended to limit the scope of the invention unless otherwise specifically indicated.

*Example 1*

Powdered metal bearings such as are used in electric motors were degassed under vacuum while such bearings were heated to a temperature just below the sintering point. The evolved volatiles were pumped off until a steady pressure below 1 micron Hg was reached. After the bearings had cooled, a quantity of high quality synthetic organic ester lubricating oil (Myvalube Lubricant A) which had been degassed during the degassing of the bearings was then poured over the bearings while the vacuum was maintained below 1 micron Hg. The vacuum was then released and the pressure rose to atmospheric pressure. The excess lubricating oil was then wiped off the bearings and they were mounted in small electric motors. These motors were operated continuously for two and one half years without additional lubrication and with no signs of bearing wear due to insufficient lubrication.

*Example 2*

Ruby jewel watch bearings were vacuum impregnated in similar fashion and the pivots were coated with chromium by vacuum evaporation. The impregnated jewel bearings were then washed with benzene, dried and installed in watches without the application of any additional lubricant. Periodic inspection over a period of more than two years showed excellent performance for such watches including good motion and less than normal loss or gain in time, and no perceptible signs of bearing wear because of the "dry" bearings.

The method embodying this invention can, of course, be used for any bearing surface in any mechanical apparatus. Adequate lubrication at all times is ensured, and no additional lubrication or cleaning of dirty lubricant is needed. The lubricant layer is tightly held on the surface and is not dislodged by mechanical wiping, friction during service or solvent extraction. The bearings operate satisfactorily over a great temperature range since there is no lubricant in the bearings to "freeze" at low temperatures. The reason why bearings impregnated in accordance with this invention operate so successfully is not clearly understood since the lubricant layer is not visible. The lubricant may be present on the surface as a monomolecular layer tightly held in the crystal interstices and forming a tenacious, coherent and cohesive layer. Since the mechanism is not known, however, it will be understood that the invention is not limited by any theory which might be advanced in explanation of the phenomenon.

The invention thus provides a simple but highly effective method of preparing self-lubricating bearing surfaces which will operate indefinitely while apparently dry. Although the invention has been described in considerable detail with reference to certain preferred embodiments, it will be understood that variations and modifications can be effected within the spirit and scope of the inven-

We claim:

1. In the treatment of a bearing surface, the improvement which comprises heating the bearing surface and maintaining it under vacuum of less than 100 microns Hg to remove adsorbed and absorbed substances given off by the bearing surface under the combined influences of the heat and the vacuum, covering the resulting clean bearing surface with a degassed liquid lubricant while maintaining the bearing surface under vacuum, subjecting the lubricant to increased pressure to cause the lubricant to come into intimate contact with the bearing surface, and thereafter removing any lubricant which is visible on the bearing surface to provide a bearing surface which will operate for long periods of time without a visible layer of lubricant on it.

2. In the treatment of a bearing surface, the method which comprises maintaining the bearing surface under vacuum of less than 100 microns Hg to remove adsorbed and absorbed substances from the bearing surface, applying heat to the bearing surface while it is maintained under the vacuum to cause substantially all of the adsorbed and absorbed substances to be removed from the bearing surface under the combined influences of the heat and the vacuum, cooling the bearing surface while it is maintained under vacuum to prevent readsorption and reabsorption of substances by the bearing surface, applying a degassed liquid lubricant to the resulting clean bearing surface while maintaining the bearing surface under vacuum, subjecting the lubricant to increased pressure to cause the lubricant to come into intimate contact with the bearing surface, and thereafter removing any lubricant which is visible on the bearing surface to provide a bearing surface which will operate for long periods of time without a visible layer of lubricant on it.

References Cited in the file of this patent

UNITED STATES PATENTS

| | | |
|---|---|---|
| 506,857 | North | Oct. 17, 1893 |
| 2,426,546 | Boswell | Aug. 26, 1947 |
| 2,484,233 | Lingal | Oct. 11, 1949 |

FOREIGN PATENTS

| | | |
|---|---|---|
| 461,167 | Canada | Nov. 15, 1949 |